(12) United States Patent
Petterson et al.

(10) Patent No.: US 7,921,806 B2
(45) Date of Patent: Apr. 12, 2011

(54) TEATCUP, AND A TEATCUP PART

(75) Inventors: Torbjorn Petterson, Gnesta (SE); Raza Mehinovic, Tumba (SE)

(73) Assignee: DeLaval Holding AB, Tumba (SE)

( * ) Notice: Subject to any disclaimer, the term of this patent is extended or adjusted under 35 U.S.C. 154(b) by 366 days.

(21) Appl. No.: 11/575,159

(22) PCT Filed: Aug. 17, 2005

(86) PCT No.: PCT/SE2005/001219
§ 371 (c)(1),
(2), (4) Date: Mar. 13, 2007

(87) PCT Pub. No.: WO2006/031164
PCT Pub. Date: Mar. 23, 2006

(65) Prior Publication Data
US 2007/0245965 A1 Oct. 25, 2007

(30) Foreign Application Priority Data
Sep. 14, 2004 (SE) ........................................ 0402203

(51) Int. Cl.
*A01J 5/06* (2006.01)
(52) U.S. Cl. .................................. 119/14.49; 119/14.51
(58) Field of Classification Search ............... 119/14.01, 119/14.47–14.49, 14.51
See application file for complete search history.

(56) References Cited

U.S. PATENT DOCUMENTS

| 1,239,923 | A | * | 9/1917 | Leitch | 119/14.51 |
| 1,507,630 | A |   | 9/1924 | Sundberg | |
| 1,556,559 | A |   | 10/1925 | Kjestrup | |
| 1,620,916 | A | * | 3/1927 | Pessell | 119/14.49 |
| 2,473,379 | A |   | 6/1949 | Lindgren | |
| 3,148,661 | A |   | 9/1964 | Lindsey | |
| 4,249,481 | A | * | 2/1981 | Adams | 119/14.02 |
| 4,459,938 | A | * | 7/1984 | Noorlander | 119/14.49 |
| 4,459,939 | A | * | 7/1984 | Noorlander | 119/14.49 |
| 4,648,350 | A | * | 3/1987 | Noorlander | 119/14.32 |
| 5,809,932 | A |   | 9/1998 | van den Berg | |
| 6,009,834 | A | * | 1/2000 | Krone et al. | 119/14.47 |
| 6,058,879 | A | * | 5/2000 | Miefalk | 119/14.47 |
| 6,308,656 | B1 |  | 10/2001 | Milbrath et al. | |
| 6,532,893 | B1 |  | 3/2003 | Edholm | |
| 6,557,488 | B1 | * | 5/2003 | Schuster et al. | 119/14.49 |
| 2008/0022932 | A1 | * | 1/2008 | Rottier et al. | 119/14.01 |

FOREIGN PATENT DOCUMENTS

| EP | 1138193 A2 | 10/2001 |
| EP | 1239726 B1 | 9/2002 |
| GB | 396450 | 8/1933 |
| WO | WO 03/024203 A1 | 3/2003 |

* cited by examiner

*Primary Examiner* — Rob Swiatek
*Assistant Examiner* — Kristen C Hayes
(74) *Attorney, Agent, or Firm* — Hovey Williams LLP

(57) ABSTRACT

The invention refers to a teatcup part and a teatcup to be attached to a teat of an animal. The teatcup includes the teatcup part (1) and a connection part (2). The teatcup part is disengageably mountable to the connection part. The teatcup part (1) includes a shell (3) and a teatcup liner (4) having an upper opening (5) and a lower opening (6). The liner forms an inner space (11) for receiving the teat through the upper opening and a pulsation chamber (12) between the liner and the shell. The connection part includes a milk-discharging member for the discharge of milk from the teatcup, and a milk channel (35) extending between the lower opening of the inner space of the liner and the milk-discharging member. The connection part also includes a pulse-supplying member for the supply of a pulsating pressure to the pulsation chamber, and a pulse channel extending between the pulsation chamber and the pulse-supplying member.

19 Claims, 4 Drawing Sheets

TEATCUP, AND A TEATCUP PART

Applicant hereby incorporates by reference International Application PCT/SE2005/001219, filed 17 Aug. 2005, claiming priority from Swedish Application No. SE 0402203-4 filed 14 Sep. 2004 (also incorporated by reference herein).

BACKGROUND OF THE INVENTION AND PRIOR ART

The present invention refers to a teatcup adapted to be attached to a teat of an animal to be milked, including a teatcup part and a connection part,
the teatcup part being disengageably mountable to the connection part,
the teatcup part including a shell and a teatcup liner having an upper opening and a lower opening,
the teatcup liner forming an inner space for receiving the teat through the upper opening and being provided in the shell in such a way that a pulsation chamber is formed between the teatcup liner and the shell,
the connection part including a milk-discharging member for the discharge of milk from the teatcup, and a milk channel arranged to extend between the lower opening of the inner space of the teatcup liner and the milk-discharging member when the teatcup part is mounted to the connection part.

The present invention also refers to a teatcup part for a teatcup adapted to be attached to a teat of an animal to be milked,
the teatcup part being adapted to be disengageably mountable to a connection part of the teatcup,
the teatcup part including a shell and a teatcup liner having an upper opening and a lower opening,
the teatcup liner forming an inner space for receiving the teat through the upper opening and being provided in the shell in such a way that a pulsation chamber is formed between the teatcup liner and the shell,
the connection part including a milk-discharging member for the discharge of milk from the teatcup, and a milk channel arranged to extend between the lower opening of the inner space of the teatcup liner and the milk-discharging member when the teatcup part is mounted to the connection part.

Teatcups used today include, typically, a shell and a teatcup liner provided in the shell. The teatcup liner is an article of consumption that is subjected to wear and thus has to be replaced on a regular basis. The replacement of the teatcup liner is a time-consuming and difficult work, requiring dismounting of the teatcup liner from the shell and mounting of a new teatcup liner in the shell. Moreover, the replacement of the teatcup liner cannot be performed during a milking operation since the milk conduit is left open when the teatcup liner is demounted, and thus large quantities of air would enter the system.

U.S. Pat. No. 6,058,879 discloses a teatcup of the kind initially defined, which has a teatcup part and a connection part. The teatcup disclosed in this document is in the first place intended for milking of smaller animals such as sheep and goats. According to the technique disclosed in this document, the whole teatcup part may be replaced as a separate part when the teatcup liner has to be replaced. However, such a replacement still requires a significant effort since the external pulse conduit is connected to the teatcup part whereas the external milk conduit is connected to the connection part. Consequently, the pulse conduit has to be disengaged from the teatcup part and mounted to a new teatcup part.

EP-A-1 138 193 discloses another teatcup having a teatcup part and a connection part. The teatcup part may be replaced as a separate part when the teatcup liner has to be replaced. However, also in this case the external pulse conduit is connected to the teatcup part whereas the external milk conduit is connected to the connection part.

SUMMARY OF THE INVENTION

The object of the present invention is to facilitate the replacement of the teatcup liner and to minimise the time needed at the milking machine for the replacement.

This object is achieved by the teatcup initially defined, which is characterised in that the connection part includes a pulse-supplying member for the supply of a pulsating pressure to the pulsation chamber, and a pulse channel arranged to extend between the pulsation chamber and the pulse-supplying member when the teatcup part is mounted to the connection part.

By means of such a teatcup having two separate parts, the replacement of the teatcup liner can be facilitated since the teatcup part is simply disengaged from the connection part and replaced by a new teatcup part, which is then attached to the connection part. No loosening of the external pulse conduit or the external milk conduit is required when replacing the teatcup part, since these conduits are connected to the connection part.

The teatcup part which has been removed from the connection part of the teatcup may then be thrown away as a waste product. However, it is also possible to replace the teatcup liner and to mount a new teatcup liner in the shell. This replacement may then be made at any suitable point of time, for instance not in connection with the milking.

According to an embodiment of the invention, the pulsation chamber is accessible via an aperture through the shell, wherein the pulse channel connects to the aperture when the teatcup part is mounted to the connection part. Advantageously, a sealing element is provided at the connection between the aperture and the pulse channel. In such a way, it may be ensured that the surrounding atmosphere cannot enter the pulsation chamber.

According to a further embodiment of the invention, the sealing element includes an elastic material enclosing the pulse channel at least in the proximity of the aperture, wherein the elastic material abuts the shell around the aperture. Furthermore, the shell may include a short pipe member provided around the aperture, wherein the short pipe member extends into the pulse channel and abuts the elastic material. In such a way, the elastic material will in a reliable manner abut the outer surface of the shell and/or the short pipe member so that an airtight sealing is achieved.

According to a further embodiment of the invention, the pulse-connection member and the milk-discharging member are provided in the proximity of each other. With such a design the external milk conduit and the external pulse conduit may be arranged to extend beside each other, which reduces the number of conduits extending in different directions around the teatcups. Advantageously, the pulse-supplying member may include a pulse nipple and the milk-discharging member may include a milk nipple, wherein the pulse nipple and the milk nipple extend from the connection part in substantially the same direction. Furthermore, the pulse nipple and the milk nipple may extend laterally outwardly from the connection part in substantially the same direction. In such a way, the external milk conduit and the external pulse conduit will connect to the teatcup laterally, which means that the total height of the teatcup may be low enabling the use of the teatcup also when the animal has teats close to the ground.

According to a further embodiment of the invention the connection part has a bottom portion and a lateral portion extending upwardly from the bottom portion along the shell when the teatcup part is mounted to the connection part. The pulse nipple and the milk nipple may then extend from the lateral portion. Furthermore, the pulse nipple and the milk nipple may be provided in the proximity of an upper end of the lateral portion.

According to a further embodiment of the invention, the lateral portion forms a support for the teatcup part when the teatcup part is mounted to the connection part. In such a way, the rigidity of the teatcup may be enhanced. Furthermore, the lateral portion may have gripping means for gripping the teatcup part when the teatcup part is mounted to the connection part. The gripping means may include a resilient clamping member adapted to extend around at least a part of the shell for obtaining the gripping of the teatcup. In such a way a secure engagement of the teatcup part in the connection part is ensured. Advantageously, the clamping member is provided at an upper end of the lateral portion.

According to a further embodiment of the invention, the connection part includes a pipe element forming a part of the milk channel and extending into the lower opening for tight abutment against the teatcup liner when the teatcup part is mounted to the connection part.

According to a further embodiment of the invention, the connection part includes a sleeve-like element for receiving a lower portion of the teatcup part. An annular recess for receiving the lower portion of the teatcup part may then be formed between the pipe element and the sleeve-like element.

According to a further embodiment of the invention the connection part has a valve adapted to open and close selectively the milk channel.

The object is also achieved by the teatcup part initially defined, which is characterised in that the teatcup part is adapted to be mounted to the connection part in such a way that a pulse channel is formed between the pulsation chamber and a pulse-supplying member provided on the connection part for the supply of a pulsating pressure to the pulsation chamber.

Preferred embodiments of the teatcup part are defined in the dependent claims 18 and 19.

BRIEF DESCRIPTION OF THE DRAWINGS

The present invention is now to be explained more closely by means of a description of various embodiments and with reference to the drawings attached hereto.

DETAILED DESCRIPTION OF VARIOUS EMBODIMENTS OF THE INVENTION

Figure 1:
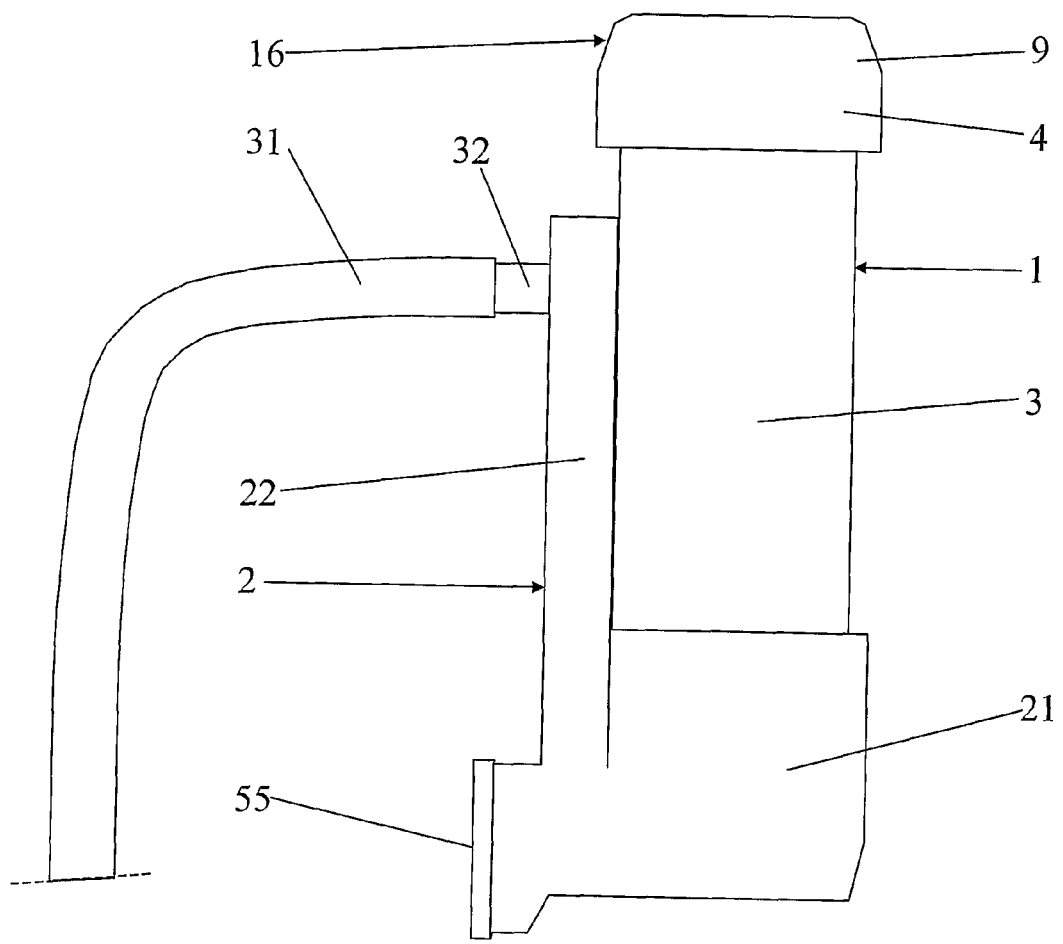
FIG. 1 discloses schematically a side view of a teatcup according to the invention.
Figure 2:
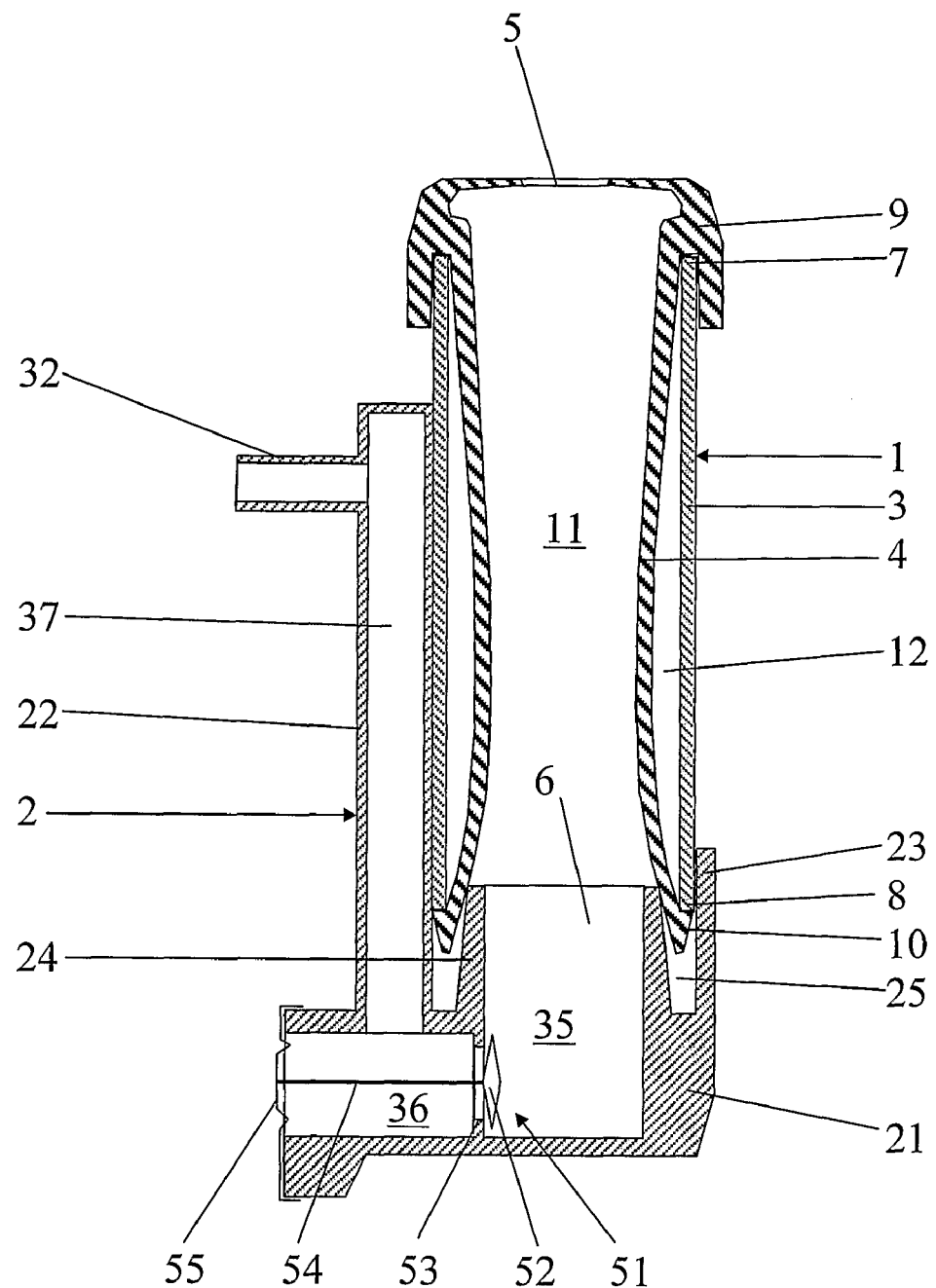
FIG. 2 discloses schematically a longitudinal sectional view of the teatcup in FIG. 1.
Figure 3:
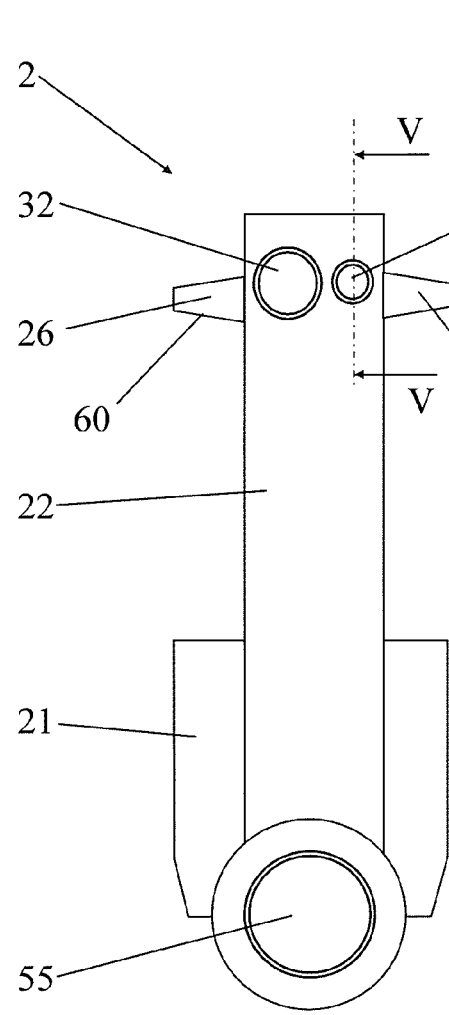
FIG. 3 discloses schematically a side view of a connection part of the teatcup in FIG. 1.
Figure 4:
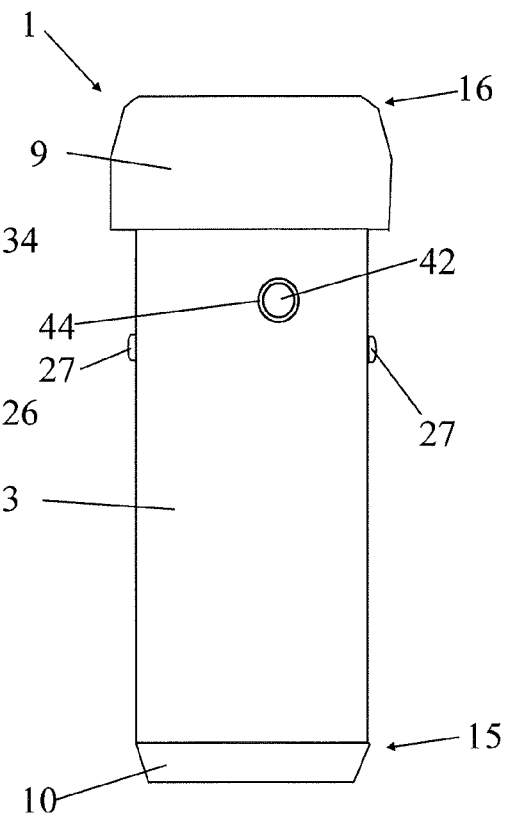
FIG. 4 discloses schematically a side view of a teatcup part of the teatcup in FIG. 1.

FIGS. 1 and 2 disclose a teatcup to be attached to a teat of an animal to be milked. The teatcup includes two separate parts, namely a teatcup part 1, see FIG. 4, and a connection part 2, see FIG. 3. The teatcup part 1 is disengageably mountable to the connection part 2. This means that the teatcup part 1 may be removed in a simple manner from the connection part 2 without the use of any tools or other means. The teatcup part 1 includes a shell 3 and a teatcup liner 4 mounted in the shell 3. In the embodiment disclosed the shell 3 is substantially circular cylindrical. However, the shell 3 may also have another cross-sectional shape. The teatcup liner 4 has an upper opening 5 and a lower opening 6. The upper opening 5 is adapted to receive a teat therethrough. The shell 3 has an upper end 7 and a lower end 8. The teatcup liner 4 has a head portion 9 located, at least partly, above the upper end 7 of the shell 3. The teatcup liner 4 also has a root portion 10 in engagement with the lower end 8 of the shell 3 and extends below the lower end 8 of the shell 3. The root portion 10 may be connected to the shell 3 in a number of different ways. Especially, it is to be noted that the root portion 10 does not have to extend below the shell 3.

Furthermore, the teatcup liner 4 forms an inner space 11 for receiving the teat through the upper opening 5, see FIG. 2. When the teatcup liner 4 is mounted in the shell 3 a pulsation chamber 12 is formed between the teatcup liner 4 and the shell 3.

The teatcup part 1 has a lower portion 15 and an upper portion 16. The connection part 2 has a bottom portion 21 and a lateral portion 22. The lateral portion 22 extends upwardly from the bottom portion 21. When the teatcup part 1 is mounted to the connection part 2, the lower portion 15 is received in the bottom portion 21, whereas the lateral portion 22 extends along the outer peripheral surface of the shell 3. The lateral portion 22 will thus form a lateral support for the shell 3 and the teatcup part 1, see FIG. 2. The bottom portion 21 of the connection part 2 includes a sleeve-like element 23. The sleeve-like element 23 extends around and encloses the lower portion 15, when the teatcup part 1 is mounted in the connection part 2. The bottom portion 21 of the connection part 2 also includes a pipe element 24 extending upwardly and concentrically inside the sleeve-like element 23 in such a way that an annular recess 25 is formed between the pipe element 24 and the sleeve-like element 23.

Consequently, the lower portion 15 of the teatcup part 1 is received in the annular recess 25 when the teatcup part 1 is mounted in the connection part 2. The pipe element 24 extends into the lower opening 6 of the teatcup liner 4. Consequently, the teatcup part 1 will be securely mounted in the recess 25 of connection part 2.

The lateral portion 22 of the connection part 2 includes a gripping means 60 adapted to grip the teatcup part 1 when the teatcup part 1 is mounted to the connection part 2. In the embodiment disclosed, see FIG. 3, the gripping means 60 includes a resilient clamping member 26 adapted to extend around a part of the shell 3. The clamping member 26 has two resilient parts extending from the lateral portion 22 along a circular path in such a way that at least half of the outer periphery of the shell 3 is enclosed by the clamping member 26. As appears from FIG. 3, the clamping member 26 is provided at an upper end of the lateral portion 22. The gripping means 60 also includes two projections 27 provided on the shell 3 and projecting from the outer surface of the shell 3. When the teatcup part 1 is mounted in the connection part 2, the projections 27 will be located directly beneath a respective one of the parts of the clamping member 26, and thus prevent in an even more secure manner the teatcup part 1 from being pulled out of the connection part 2. It is to be noted that the gripping means 60 may be designed in other ways and may be arranged in another position than at the upper end of the lateral portion 22.

The connection part 2 includes a milk-discharging member for the discharge of milk from the teatcup. In the embodiments disclosed the milk discharging member is adapted to be connected to an external milk conduit 31, see FIG. 1, and is designed as a milk nipple 32 that extends laterally outwardly from an upper end of the lateral portion 22 of the connection part 2. It is to be noted the milk-discharging member as an alternative may be designed as a conduit extending from the teatcup and adapted to be connected to a claw or a milk-receiving container adapted for so called quarter milking. The connection part 2 also includes a pulse-supplying member for the supply of a pulsating pressure to the pulsating chamber 12. In the embodiments disclosed the pulse-supplying member is adapted to be connected to an external pulse-conduit 33, see FIG. 5, and is designed as a pulse nipple 34. Also the pulse nipple 34 extends in the embodiment disclosed laterally outwardly from an upper end of the lateral portion 22 of the connection part 2. It is also to be noted the pulse-supplying member as an alternative may be designed as a conduit extending from the teatcup and adapted to be connected to a claw or a pulsator.

In the embodiment, disclosed, the pulse nipple 34 and the milk nipple 32 both extend laterally outwardly from the lateral portion 22 in substantially the same direction. The pulse nipple 34 and the milk nipple 32 are provided beside each other along a substantially horizontal line. It is, however, also possible to provide the pulse nipple 32 and the milk nipple 34 along a substantially vertical line. The external milk conduit 31 and the external pulse conduit 33 may extend beside each other to form a conduit bundle. The conduits 31 and 33 are resilient but may be pre-shaped to extend substantially straight laterally from the side of the teatcup in a substantially horizontal direction, and have a bend to a substantially vertical direction. The conduits 31 and 33 thus have a substantially horizontal portion, a bent portion and a substantially vertical portion, wherein the vertical portion is connected to a claw or any similar member, for instance designed for collecting the milk form each udder quarter separately.

The connection part 2 also includes a milk channel 35, which extends between the lower opening 6 of the inner space 11 of the teatcup liner 4 and the milk nipple 32, see FIG. 2. The milk channel 35 is formed by the interior of the pipe element 24, an inner space 36 in the bottom portion 21 of the connection part 2 and a lateral channel 37 extending upwardly through the lateral portion 22 to the milk nipple 32. For hygienic reasons, the milk channel 35 is designed to provide a smooth path for the milk, avoiding substantially all pockets and sharp corners where milk, dirt or any other particles may be collected.

Figure 5:
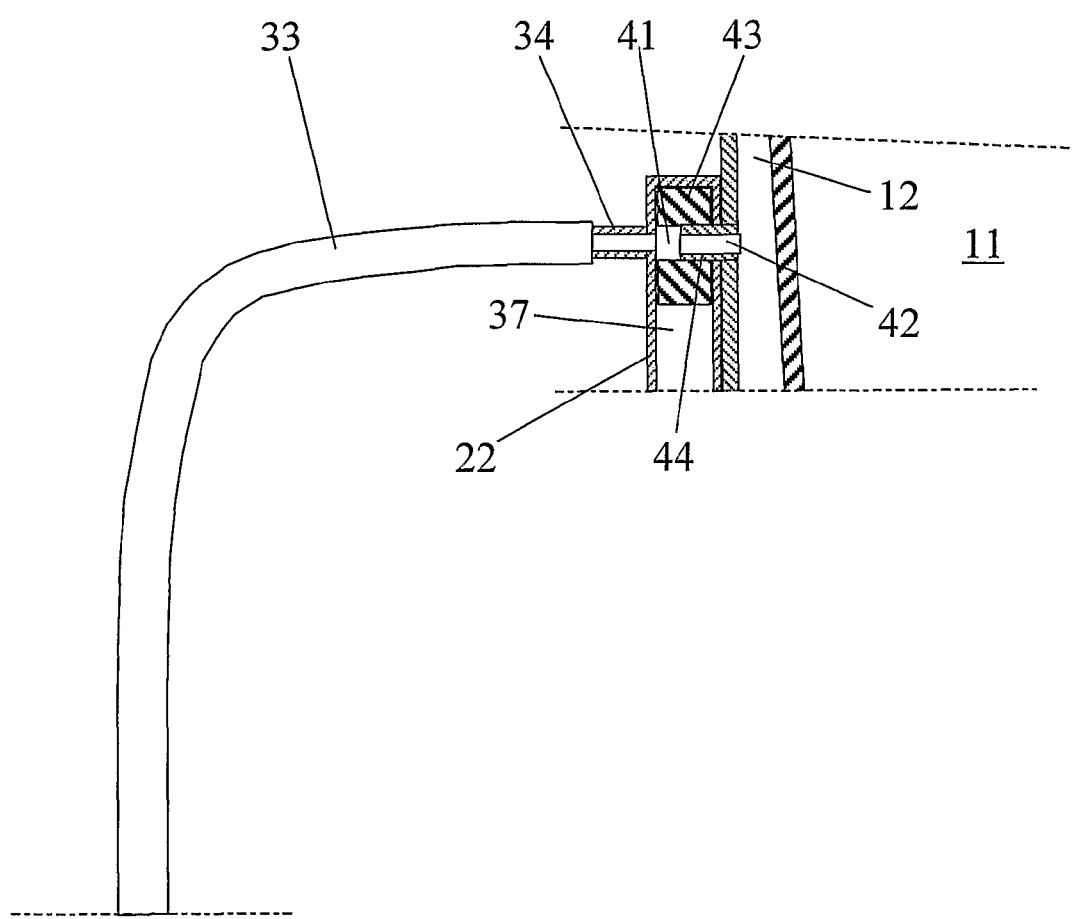
FIG. 5 discloses schematically a sectional view along the line V-V in FIG. 3.

The connection part 2 also includes a pulse channel 41 extending between the pulsation chamber 12 and the pulse nipple 34, see FIG. 5. An aperture 42 is provided in the shell 3 to give access to the pulsation chamber 12. The pulse channel 41 thus extends through the aperture 42 in the shell 3. Furthermore, a sealing element 43 is provided outside the aperture 42 and surrounds the aperture 42. The aperture 42 is in the embodiment disclosed surrounded by a short pipe member 44, wherein the short pipe member 44 extends into the sealing element 43. The pulse channel 41 thus extends from the pulsation chamber 12 via the aperture 42, the short pipe member 44 and the sealing element 43 to the pulse nipple 24. The sealing element 43 includes an elastic material enclosing the pulse channel 41 in the proximity of the aperture 42. The elastic material abuts the outer surface of the shell 3 around the aperture 42 and the outer surface of the short pipe member 44 in such a way that an airtight connection is achieved. The sealing of the pulse channel 41 may be provided in various ways. For instance, it may be dispensed with the short pipe member 44 around the aperture 42. The sealing element 43 as disclosed may be replaced by a sealing element abutting the surface around the aperture 42. Such a sealing element may be arranged on the outer wall of the shell 3 and/or on the outer wall of the lateral portion 22 facing the shell 3. The pulse nipple 34 may extend through the lateral portion 22 and the lateral channel 37, and possibly into the aperture 42 of the shell 3.

The teatcup also includes a valve 51 adapted to open and close selectively the milk channel 35. The valve 51 is provided in the bottom portion 21 of the connection part 2. The valve 51 includes a valve body 52 arranged to close the milk channel 51 by abutting a valve seat 53. The valve body is via a rod 54 connected to a membrane 55, which adjoins the surrounding atmosphere. When a vacuum or low pressure prevails in the inner space 11 and the milk channel 35 the membrane will be forced inwardly, wherein the valve body is moved away from the valve seat 53. When the teatcup is removed from the teat the surrounding atmospheric pressure will prevail in the inner space 11 and the milk channel, wherein the membrane will be forced outwardly and pull the valve body 52 against the valve seat 53.

The present invention is not limited to the embodiments disclosed but may be varied and modified within the scope of the following claims.

The invention claimed is:

1. A teatcup adapted to be attached to a teat of an animal to be milked, comprising:
   a teatcup part; and
   a connection part,
   the teatcup part being disengageably mountable to the connection part,
   the teatcup part including a shell and a teatcup liner having an upper opening and a lower opening, the teatcup liner forming an inner space for receiving the teat through the upper opening and being provided in the shell in such a way that a pulsation chamber is formed between the teatcup liner and the shell,
   the connection part including a milk-discharging member for the discharge of milk from the teatcup, and a milk channel arranged to extend between the lower opening of the inner space of the teatcup liner and the milk-discharging member when the teatcup part is mounted to the connection part, wherein the connection part includes a pulse-supplying member for the supply of a pulsating pressure to the pulsation chamber, and a pulse channel, the pulse channel of the connection part extending between the pulsation chamber of the teatcup part and the pulse-supplying member of the connection part when the teatcup part is mounted to the connection part,
   wherein the connection part has a valve adapted to open and selectively close the milk channel,
   wherein the pulsation chamber of the teatcup part is accessible via an aperture through the shell,
   wherein the pulse channel of the connection part connects to the aperture when the teatcup part is mounted to the connection part, and
   wherein a sealing element is provided at a connection between the aperture and the pulse channel.

2. A teatcup according to claim 1, wherein the sealing element includes an elastic material enclosing the pulse channel at least in the proximity of the aperture, wherein the elastic material abuts the shell around the aperture.

3. A teatcup according to claim 2, wherein the shell includes a short pipe member provided around the aperture, wherein the short pipe member extends into the pulse channel and abuts the elastic material.

4. A teatcup according to claim 1, wherein the pulse-supplying member and the milk-discharging member are provided in the proximity of each other.

5. A teatcup according to claim 4, wherein the pulse-supplying member includes a pulse nipple and the milk-discharging member a milk nipple, wherein the pulse nipple and the milk nipple extend from the connection part in substantially the same direction.

6. A teatcup according to claim 5, wherein the pulse nipple and the milk nipple extend laterally outwardly from the connection part in substantially the same direction.

7. A teatcup according to claim 5, wherein the connection part has a bottom portion and a lateral portion extending upwardly from the bottom portion along the shell when the teatcup part is mounted to the connection part, and wherein the pulse nipple and the milk nipple extend from the lateral portion.

8. A teatcup according to claim 1, wherein the connection part has a bottom portion and a lateral portion extending upwardly from the bottom portion along the shell when the teatcup part is mounted to the connection part.

9. A teatcup according to claim 8, wherein the lateral portion forms a support for the teatcup part when the teatcup part is mounted to the connection part.

10. A teatcup adapted to be attached to a teat of an animal to be milked comprising:
    a teatcup part; and
    a connection part,
    the teatcup part being disengageably mountable to the connection part,
    the teatcup part including a shell and a teatcup liner having an upper opening and a lower opening, the teatcup liner forming an inner space for receiving the teat through the upper opening and being provided in the shell in such a way that a pulsation chamber is formed between the teatcup liner and the shell,
    the connection part including a milk-discharging member for the discharge of milk from the teatcup, and a milk channel arranged to extend between the lower opening of the inner space of the teatcup liner and the milk-discharging member when the teatcup part is mounted to the connection part, wherein the connection part includes a pulse-supplying member for the supply of a pulsating pressure to the pulsation chamber, and a pulse channel, the pulse channel of the connection part extending between the pulsation chamber of the teatcup part and the pulse-supplying member of the connection part when the teatcup part is mounted to the connection part,
    wherein the connection part has a valve adapted to open and selectively close the milk channel,
    wherein the pulsation chamber of the teatcup part is accessible via an aperture through the shell, wherein the pulse channel of the connection part connects to the aperture when the teatcup part is mounted to the connection part
    wherein the pulse-supplying member and the milk-discharging member are provided in the proximity of each other,
    wherein the pulse-supplying member includes a pulse nipple and the milk-discharging member a milk nipple, wherein the pulse nipple and the milk nipple extend from the connection part in substantially the same direction,
    wherein the connection part has a bottom portion and a lateral portion extending upwardly from the bottom portion along the shell when the teatcup part is mounted to the connection part and wherein the pulse nipple and the milk nipple extend from the lateral portion, and
    wherein the pulse nipple and the milk nipple are provided in the proximity of an upper end of the lateral portion.

11. A teatcup adapted to be attached to a teat of an animal to be milked comprising:
    a teatcup part; and
    a connection part,
    the teatcup part being disengageably mountable to the connection part,
    the teatcup part including a shell and a teatcup liner having an upper opening and a lower opening, the teatcup liner forming an inner space for receiving the teat through the upper opening and being provided in the shell in such a way that a pulsation chamber is formed between the teatcup liner and the shell,
    the connection part including a milk-discharging member for the discharge of milk from the teatcup, and a milk channel arranged to extend between the lower opening of the inner space of the teatcup liner and the milk-discharging member when the teatcup part is mounted to the connection part, wherein the connection part includes a pulse-supplying member for the supply of a pulsating pressure to the pulsation chamber, and a pulse channel, the pulse channel of the connection part extending between the pulsation chamber of the teatcup part and the pulse-supplying member of the connection part when the teatcup part is mounted to the connection part,
    wherein the connection part has a valve adapted to open and selectively close the milk channel,
    wherein the pulsation chamber of the teatcup part is accessible via an aperture through the shell,
    wherein the pulse channel of the connection part connects to the aperture when the teatcup part is mounted to the connection part,
    wherein the connection part has a bottom portion and a lateral portion extending upwardly from the bottom portion along the shell when the teatcup part is mounted to the connection part, and
    wherein the lateral portion has a gripping means for gripping the teatcup part when the teatcup part is mounted to the connection part.

12. A teatcup according to claim 11, wherein the gripping means includes a resilient clamping member adapted to extend around at least a part of the shell for obtaining the gripping of the teatcup part.

13. A teatcup according to claim 11, wherein the gripping means is provided at an upper end of the lateral portion.

14. A teatcup adapted to be attached to a teat of an animal to be milked comprising:
    a teatcup part; and
    a connection part,
    the teatcup part being disengageably mountable to the connection part,
    the teatcup part including a shell and a teatcup liner having an upper opening and a lower opening, the teatcup liner forming an inner space for receiving the teat through the upper opening and being provided in the shell in such a way that a pulsation chamber is formed between the teatcup liner and the shell,
    the connection part including a milk-discharging member for the discharge of milk from the teatcup, and a milk channel arranged to extend between the lower opening of the inner space of the teatcup liner and the milk-discharging member when the teatcup part is mounted to the connection part, wherein the connection part includes a pulse-supplying member for the supply of a pulsating pressure to the pulsation chamber, and a pulse channel, the pulse channel of the connection part extending between the pulsation chamber of the teatcup part and the pulse-supplying member of the connection part when the teatcup part is mounted to the connection part, wherein the connection part has a valve adapted to open and selectively close the milk channel, wherein the pulsation chamber of the teatcup part is accessible via an aperture through the shell, wherein the pulse channel of the connection part connects to the aperture when the teatcup part is mounted to the connection part, and wherein the connection part includes a pipe element forming a part of the milk channel and extending into the lower opening of the teatcup liner for tight abutment against the teatcup liner when the teatcup part is mounted to the connection part.

15. A teatcup according to claim 1, wherein the connection part includes a sleeve-like element for receiving a lower portion of the teatcup part.

16. A teatcup according to claim 14, wherein the connection part includes a sleeve-like element for receiving a lower portion of the teatcup part and wherein an annular recess for receiving the lower portion of the teatcup part is formed between the pipe element and the sleeve-like element.

17. A teatcup part for a teatcup adapted to be attached to a teat of an animal to be milked, the teatcup part being adapted to be disengageably mountable to a connection part of the teatcup, the teatcup part comprising:

a shell;

and a teatcup liner having an upper opening and a lower opening, the teatcup liner forming an inner space for receiving the teat through the upper opening and being provided in the shell in such a way that a pulsation chamber is formed between the teatcup liner and the shell, the connection part including a milk-discharging member for the discharge of milk from the teatcup, and a milk channel arranged to extend between the lower opening of the inner space of the teatcup liner and the milk-discharging member when the teatcup part is mounted to the connection part, wherein the teatcup part is adapted to be mounted to the connection part in such a way that a pulse channel of the connection part is formed extending between the pulsation chamber of the teatcup part and a pulse-supplying member provided on the connection part when the teatcup part is mounted to the connection part for the supply of a pulsating pressure to the pulsation chamber, wherein the connection part has a valve adapted to open and selectively close the milk channel, wherein the pulsation chamber of the teatcup part is accessible via an aperture through the shell, wherein the pulse channel of the connection part connects to the aperture when the teatcup part is mounted to the connection part, and wherein a sealing element is provided at a connection between the aperture and the pulse channel.

18. A teatcup part according to claim 17, wherein the sealing element includes an elastic material enclosing the pulse channel at least in the proximity of the aperture, wherein the elastic material abuts the shell around the aperture.

19. A teatcup part according to claim 18, wherein the shell includes a short pipe member provided around the aperture, wherein the short pipe member extends into the pulse channel and abuts the elastic material.

* * * * *